UNITED STATES PATENT OFFICE.

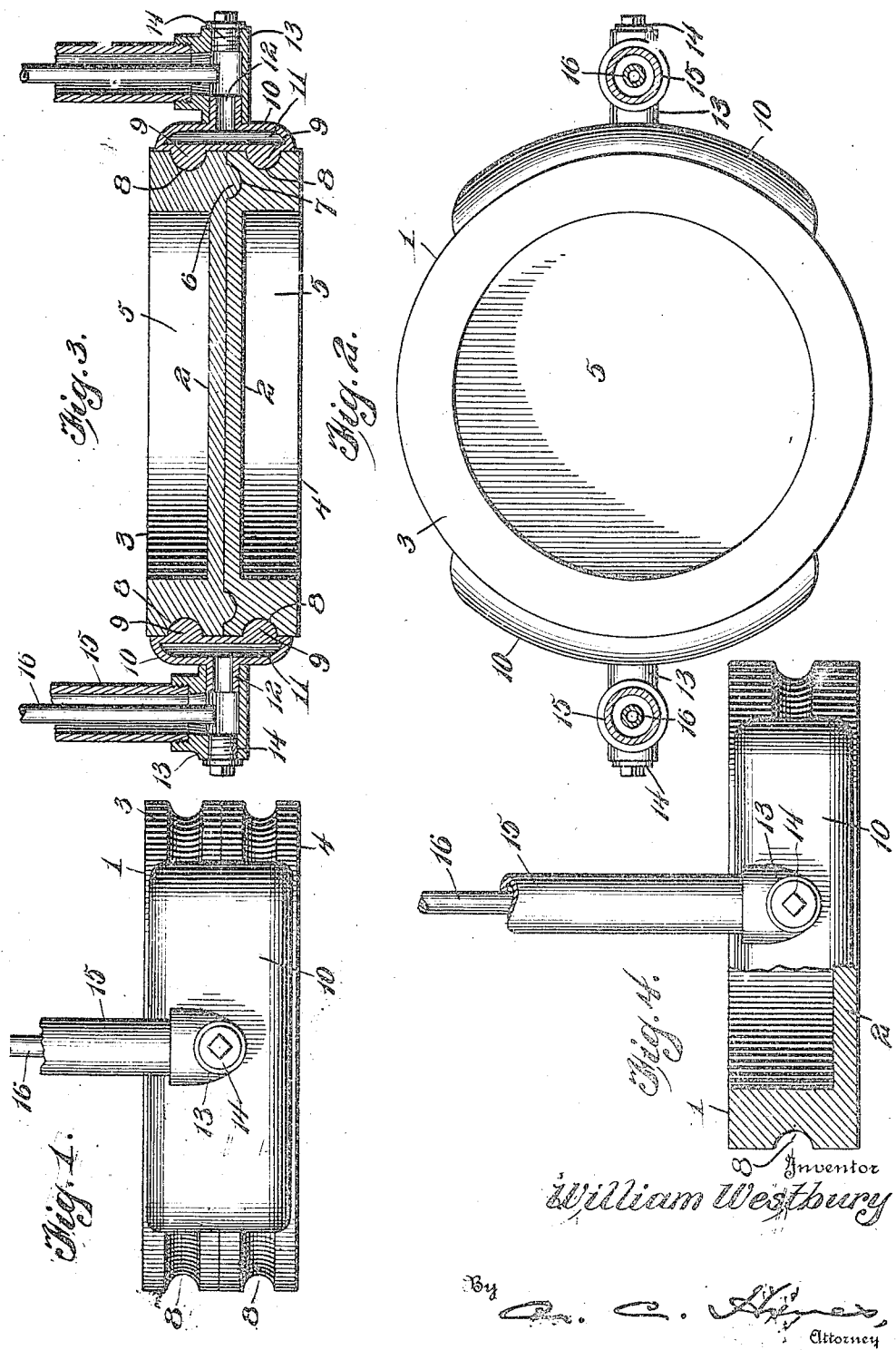

WILLIAM WESTBURY, OF OKMULGEE, OKLAHOMA.

POT CONSTRUCTION.

1,277,511.    Specification of Letters Patent.    Patented Sept. 3, 1918.

Application filed October 3, 1917.   Serial No. 194,498.

*To all whom it may concern:*

Be it known that I, WILLIAM WESTBURY, a citizen of the United States, residing at Okmulgee, in the county of Okmulgee and State of Oklahoma, have invented new and useful Improvements in Pot Constructions, of which the following is a specification.

This invention relates to a reversible pot for glass drawing apparatus, for use in drawing glass cylinders.

One object of the invention is to provide a reversible pot having improved means for holding and adjusting it, said means permitting of the ready and convenient removal of the pot for repairs, replacement, etc.

Another object of the invention is to provide novel means for cooling the pot holding means, to adapt the same to effectually withstand the intense heat.

Still another object of the invention is to provide a holding means for interchangeable use with either a single or a double reversible pot.

Still another object of the invention is to provide a double reversible pot, the pot sections of which are adapted to be assembled and disassembled with ease and facility.

The invention consists of the features of construction, combination and arrangement of parts hereinafter fully described and claimed, reference being had to the accompanying drawing, in which:

Figure 1 is a side elevation of a double reversible pot embodying my invention;

Fig. 2 is a top plan view of the same;

Fig. 3 is a vertical transverse section thereof;

Fig. 4 is a similar view showing the embodiment of the invention in a single reversible pot.

Referring now more particularly to the drawings, 1 designates a glass drawing pot which, in the embodiment of the invention shown in Figs. 1, 2 and 3, is in the form of a double pot, and in the embodiment of the invention shown in Fig. 4, is in the form of a single pot. In both structures the pots are provided with closed bottoms 2, and said pots are made of clay or other suitable highly refractory material.

The double pot structure comprises two superimposed pot sections 3 and 4 arranged back to back, or having their bottoms 2 in abutting contact and their glass receiving chambers or cavities 5 facing in opposite directions, one facing downwardly or in draining position, while the other faces upwardly in operative position to receive the charge of glass.

As shown, the pot sections 3 and 4 are provided with interengaging connections, in the form of ribs or projections 6 upon the bottom of one section engaging grooves or recesses 7 in the bottom of the other section, whereby said pot sections are held in proper alinement and from slipping laterally upon one another. The pot sections are also formed in their outer sides with spaced annular grooves 8, one in each pot section, to receive correspondingly spaced ribs or projections 9 upon metallic heads or clamps 10, arranged at diametrically opposite sides of the pot.

The heads or clamps 10 form part of a support whereby the pot is held and adapted to be raised and lowered, and special provision is made for keeping said heads cool to adapt them to withstand the intense heat to which they are subjected. To this end each head is cored to form a water chamber 11 with which communicates a tubular projection 12, said projection forming a passage for the inflow of cool water to and the outflow of the heated water from the water chamber.

Each projection 12 also serves as a spindle or trunnion pivotally mounting the pot in T-shaped conducting bearings 13, closed at their outer ends by plugs or stuffing boxes 14 and mounted upon the lower ends of tubular supports 15. The tubular supports 15 serve as water conductors or return pipes, for the flow of the heated water from the chambers 11 to a suitable waste or drain outlet. Extending through the pipes 15 are cool water supply pipes 16 leading from a suitable source of cold water supply and communicating at their lower ends with the chambers 11 or couplings 13.

It will thus be seen that provision is made for holding the pot sections assembled and pivotally mounting the same so that the pots may be reversed, enabling one (the upper) pot to be filled with glass for the drawing action while the other or lower pot is being subjected to the heat of the furnace for the melting and drainage out of the aftermath from the preceding drawing operation. Also it will be seen that the heads or clamps 10 will absorb a portion of the heat from the pot, thereby prolonging the life of the pot, and that the cooling water flowing through the heads will also keep the same comparatively cool and prevent them from rapidly disintegrating under the intense heat.

In practice, the pipes 15 are suitably held in fixed relation and connected with suitable hoisting means whereby they may be raised and lowered to raise and lower the pot with relation to the drawing opening in the glass furnace whereby the pot may be positioned above or below the drawing opening for reversal, lowered to dip up the molten glass, and positioned in the drawing opening for the drawing action or to allow the pot to be filled by means of a ladle, if desired. By spreading the heads and pipes the pot sections may be released to enable one or both to be repaired or new pot sections to be substituted therefor.

The above description of the mode of mounting the pot also applies to the single pot structure shown in Fig. 4. In the case of this single pot structure, however, it will be understood that the pot is filled and the cylinder drawn, the pot reversed to melt and drain out the aftermath, and the pot then turned back to normal position for a repetition of the filling and drawing operations.

Having thus described my invention, I claim:

1. A glass drawing pot comprising a pot body including superposed pot sections each having a bottom in engagement with the other section, clamping members disposed on opposite sides of said sections and retaining the same assembled, said clamping members having chambers and fluid conducting spindles communicating therewith, a bearing associated with each clamping member and having angularly disposed passages, one of which is opened at both ends to revolubly receive the adjacent spindle in one end, a removable stuffing box in the other end of the passage, and fluid conducting pipes disposed in the other passage of the bearing, one of said pipes forming a support for said bearing.

2. A glass drawing pot comprising a pot body including superposed pot sections, the bottoms of which are in abutting relation and provided with interengaging ribs and grooves, clamping members arranged on opposite sides of said sections and having cooling chambers and hollow spindles projecting therefrom; bearings associated with said clamping members and having angular passages one of which receives the adjacent spindle whereby to revolubly mount said sections, fluid inlet pipes extending into the other passages of said bearings, and fluid outlet pipes surrounding said inlet pipes and secured in said other passages whereby to form supports for the bearings.

In testimony whereof I affix my signature.

WILLIAM WESTBURY.